United States Patent Office 2,821,416
Patented Jan. 28, 1958

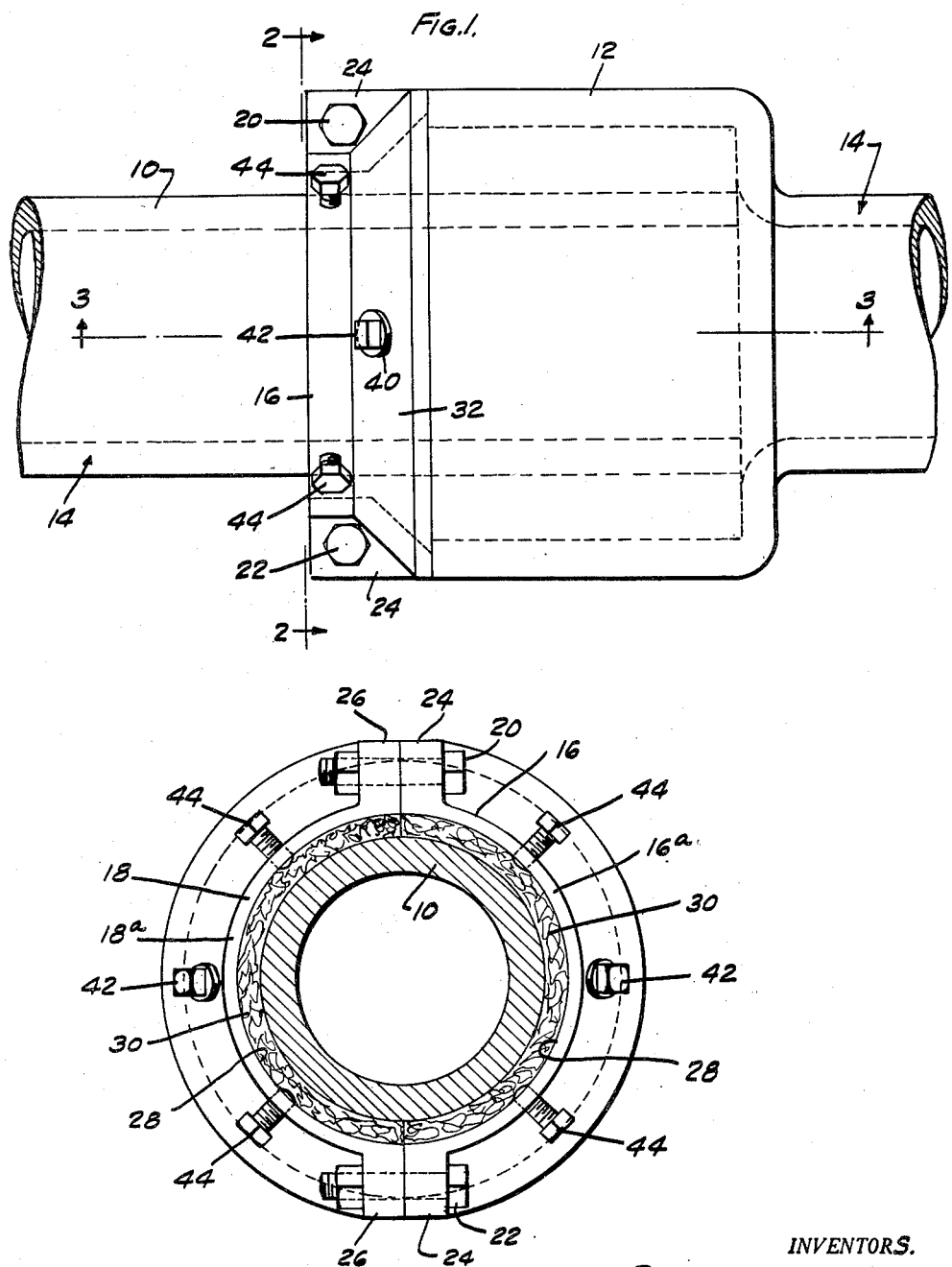

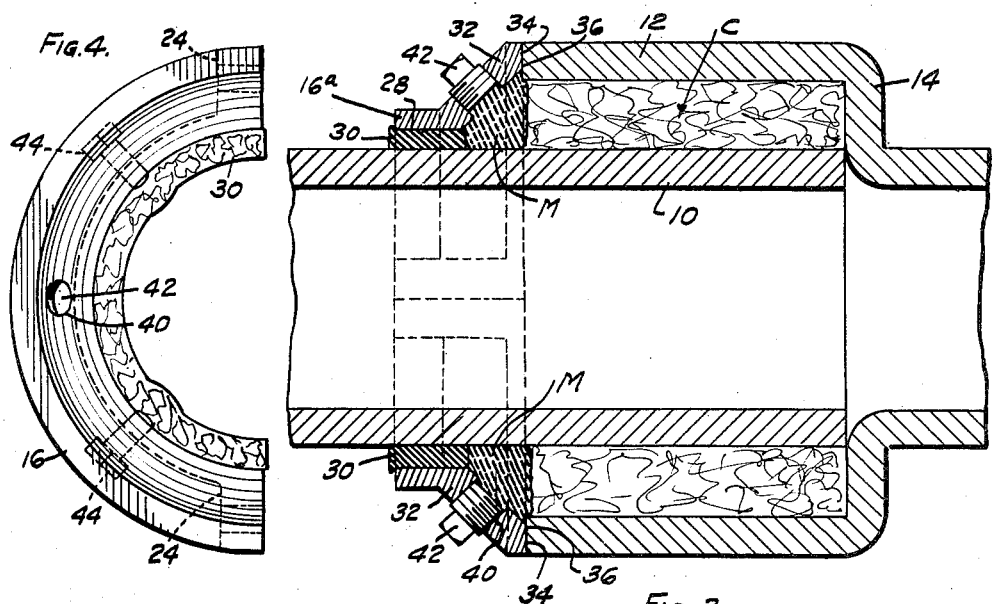
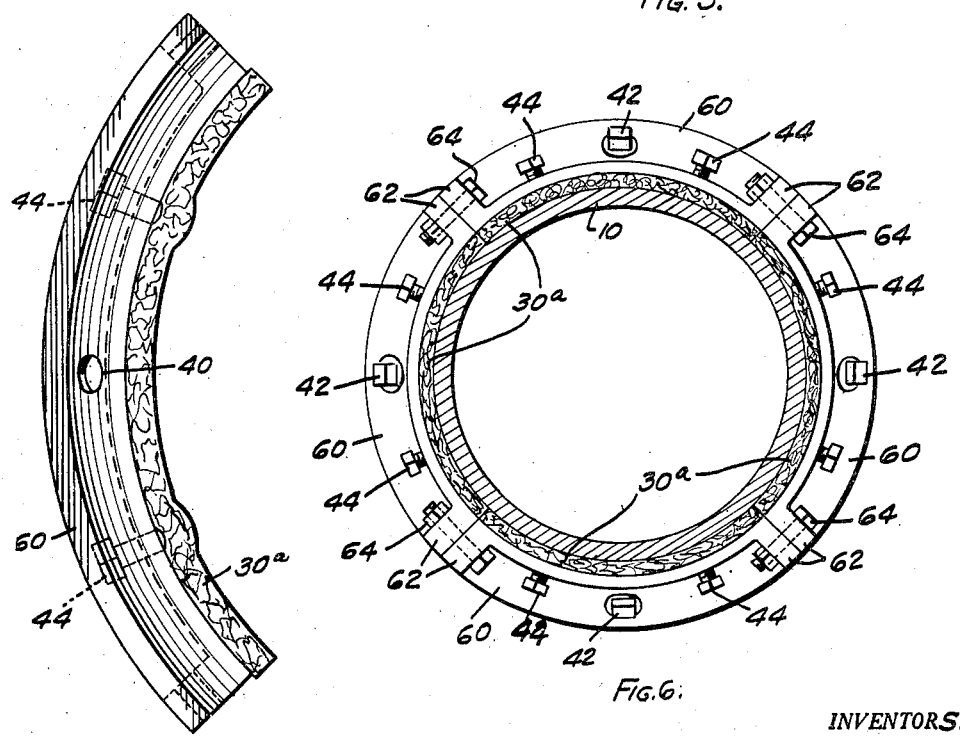

2,821,416

HOUSING-FORMING CLAMP FOR BELL AND SPIGOT PIPES OF THE MOLDED JOINT TYPE

Robert M. Soehnlen, Beloit, and Eugene Alters, Fond du Lac, Wis.

Application June 10, 1954, Serial No. 435,727

4 Claims. (Cl. 285—172)

Our invention relates generally to improvements in leak clamps for bell joint pipe seals.

Our invention relates more particularly to improvements in leak clamps for seals in pipes at the junction of the ends of continuous pipe connected in end-to-end relation by bell joints.

Pipe lines such as are now used for distribution and conveyance of natural gas, water or other similar utilities, frequently spring leaks at the pipe connections, and particularly at the bell joints of the pipe lines.

The principal object of the present invention is to provide an improved sealing means in the nature of clamps to provide an effective seal for the bell joints of fluid pipe lines.

A further object of the invention is to provide an effective seal at the bell joints of pipe lines that are laid in end-to-end relation, said seal to include clamp members for enclosing a compound or cement which will not be affected by lack of moisture, heat, pressure, or other conditions caused by the fluid passing through the pipe line.

The invention further contemplates the use of semi-cylindrical clamp rings adapted to be fastened over the male end of a pipe at a juncture with the female or bell portion of an alignment pipe, the clamp members adapted to be fastened together and to the pipe to effect an enclosed circular area at the pipe joint which is then filled with a sealing compound which becomes an effective seal at the bell connection.

This application is a continuation in part of our co-pending application Serial No. 404,348, filed January 15, 1954, and now abandoned.

For a more comprehensive understanding of the invention and the features thereof, reference is had to the accompanying drawings, in which:

Fig. 1 is a side elevational view of the joint ends of a pair of aligned pipes, the pipes being joined by a bell joint therebetween showing one form of the invention applied thereto;

Fig. 2 is a transverse sectional view thereof taken on the line 2—2 of Fig. 1;

Fig. 3 is a longitudinal sectional view thereof taken on the line 3—3 of Fig. 1;

Fig. 4 is a front view of one of the semi-circular segments which we employ;

Fig. 5 is a front view of one of the quadrant shaped segments which we prefer to employ in making connections between pipes of comparatively large diameter; and Fig. 6 is a sectional view similar to Fig. 2, showing a large pipe assembly with four quadrant shaped sectors of leak clamps assembled thereon.

In the embodiment of the invention which we have chosen to illustrate and describe the same, in Fig. 1 we have shown the male end 10 of a cast iron or similar pipe which is inserted into an enlarged bell end section 12 of a similar piece of pipe 14 which also has a male end 10 to be introduced into the bell joint 12 of an aligned pipe, as is well known in the art.

In sealing a joint against leaks at the juncture of a pair of aligned pipes as above described, we provide a pair of semi-circular clamp members 16 and 18 which are adapted to be fastened together about the male end 10 of the pipe 14 by means of bolt and nut members 20 and 22 which fasten through lug portions 24 on the clamp 16 and similar lug portions 26 on the clamp 18. Each of the clamps 16 and 18 is formed with a semi-cylindrical flange or half sleeve 16a and 18a, respectively, each defining a concave surface 28 to which a relatively thick sponge rubber or other compressible gasket element 30 may be fastened, preferably by an adhesive. Each of the clamp members is formed with an outwardly tapered lip or skirt portion 32 which has a surface 34 adapted to be positioned adjacent or engage or abut against the end 36 of the bell portion 12 of the pipe 14.

When the clamps are thus fastened about the end 10 of the male pipe adjacent the bell end 12, a circular area is enclosed between the gasket 30 and the caulking C (see Fig. 3) which is normally placed between the two adjoining ends of the pipe. This area is adapted to be filled with a rubber cement or sealing compound M, such as the plastic base compound polysulfide elastomer, which may be introduced through one or more openings 40 in the tapered flange 32, the openings being closed by set screws 42 after the sealing operation. In order to firmly fasten the clamp members 16 and 18 about the male end 10 of the pipe, we provide a plurality of gasket expander bolts or screws 44 which extend through the semi-circular flange portions 16a and 18a of the clamps and bear against the gasket 30, thereby frictionally sealing and holding the clamp assembly on the portion 10 of the pipe. This permits the clamp assembly to be securely applied even where the outer periphery of pipe end 10 is not truly circular and yet provides a complete closing off of the space that is to be filled with rubber cement.

In Figs. 5 and 6 we have shown a modified form of the invention wherein the clamps are shown as quadrant shaped clamp members 60, each provided with end flange portions 62 to receive fastening bolts 64 and each also provided with compressible gasket portions 30a capable of being compressed and fastened against the pipe end 10 by means of fastening bolts 44, two of which may be provided for each quadrant-shaped sector. Sealing openings 40 are provided in each of the quadrant-shaped clamps for the introduction of the rubber cement or sealing compound M, each of the openings being provided with a set screw 42 for closing the same after the introduction of the sealing compound. This compound adheres to the packing or caulking, the clamps, and both sections of the pipe.

From the foregoing description it can be seen that we have provided a new type of leak clamp for cast iron bell joint repair, the clamp being of simple construction that does not fit or extend over the bell end 12, but is disposed beside it, unlike clamps on the market today. By the use of these clamps no adjustment or filling and facing of the bell is required; the clamps do not bolt across the bell and cause the pipe connection to become rigid with the possibility of future pipe breakage.

This leak clamp together with compound M effects a seal by adhesion rather than by compression. That is, the rubber compound adheres to all exposed surfaces and forms a complete seal which is not dependent upon some form of clamp to restrain the pipe elements against relative movement. Actually, some movement of the pipe elements is permitted without adverse effect on the seal since compound M is flexible when it hardens. This is to be distinguished from conventional clamps which are adapted to provide a seal by compression by molding the pipe ends together. Conventionally lead and hemp is interposed between the pipe ends, and when the latter clamps are employed, vibration or movement of either pipe element forming the pipe joint applies tremendous leverage to the clamps, generally damaging them and/or the pipe; the lead seal ordinarily thereupon breaks, and hemp being fibrous, does not maintain the seal.

In the installation of our clamp it is desirable that the entire joint be cleaned and recaulked, the unfilled portion of the joint recess, if any, being filled with the compound previously mentioned after the device is applied. Thus the clamp cooperates with the end of the bell end 12 to form a mold and retainer for the compound, and instead of applying a compressive strain against the pipe joint, the clamp becomes a part of the molded joint. This allows movement and vibration to take place without the danger of bolts loosening and leaks occurring, as has been the case with the type of clamps which were previously available. In the ordinary prior art type of leak clamp, the compressive forces required to maintain the seal by compression often cause pipe breakage when the joint is jarred or vibrated.

It may be added that the relatively thick sponge rubber gasket together with bolts 44 permit the clamp to be securely fastened to pipe that is not truly circular and yet insure that the area enclosed by the clamp will be completely closed off, since the bolts stretch or expand the gasket radially thereof to fill up the space that would otherwise exist between the clamp and the outer periphery of the pipe. Moreover, the sponge rubber gasket permits the clamp to be pivoted or twisted longitudinally of the pipe by vibration or other movement of the pipe, thereby avoiding injury to the clamp and damage to the seal.

While we have illustrated and described a specific embodiment of the invention, we contemplate that changes and modifications may be made in the exact details shown and we do not wish to limit ourselves in any particular; rather what we desire to secure and protect by Letters Patent of the United States is:

We claim:

1. A sealing device for bell joint pipe comprising a collar received over the spigot end of a pipe length adjacent the bell end of the next adjacent pipe length, said collar comprising a plurality of flange members each having an outwardly flared lip, said flange members being secured together about said spigot end with said lips being positioned closely adjacent the end of the end bell, a relatively thick flexible sponge rubber gasket strip positioned between each of said flange members and said spigot end, said gasket strips being fixed to the respective flange members by adhesive means, and screw-threaded adjusting means carried by each flange member, said adjusting means being in contact with the respective gasket strips and extending radially of the respective flange members, said gasket strips permitting limited twisting movement of said collar with respect to the spigot end and said adjusting means stretching the respective gasket strips radially away from said collar and into contact with the spigot end of the pipe, said lips forming a chamber at the end bell and said chamber being substantially filled with cement.

2. A sealing device for bell joint pipe comprising a collar received over the spigot end of a pipe length adjacent the bell end of the next adjacent pipe length, said collar comprising a plurality of flange members each having an outwardly flared lip, said flange members being secured together about said spigot end, said lips being positioned closely adjacent but not over the end of the end bell and forming a chamber at the end bell, said collar being formed with at least one pair of substantially diametrically opposed ports leading to said chamber, said chamber being substantially filled with cement through one of said ports, whereby the other port acts as a vent to vent said chamber ahead of the cement as it fills said chamber.

3. A sealing device for bell joint pipe comprising a collar received over the spigot end of a pipe length adjacent the bell end of the next adjacent pipe length, said collar including an outwardly flared lip portion and a flange portion, said flange portion being received about said spigot end with said lip portion being positioned closely adjacent the end of the bell end, said lip portion forming with said end bell a chamber adapted to receive sealing material, relatively thick flexible gasket means positioned between said flange portion of said collar and said spigot end, said gasket means being fixed to said flange portion by adhesive means, and screw threaded adjusting means carried by said flange portion of said collar at spaced points thereabout, said adjusting means being in contact with said gasket means, said gasket means permitting limited twisting movement of said collar with respect to the spigot end and said adjusting means stretching said gasket means away from said flange portion of said collar and into contact with the spigot end of the pipe.

4. A permanent joint for the telescoped bell and spigot ends of a pair of pipe sections comprising a cylindrical gasket surrounding the spigot of one pipe section and spaced from the outer end of the bell of the other pipe section, a pair of substantially identical half-round collar members each being made of rigid metal and including a semi-cylindrical flange terminating at each end in an outstanding perforated ear, fastening means extending through the ears of the two members clamping them together in embracing relation to said spigot gasket, an outwardly flaring lip portion extending from the outer edge of each of the flanges to form a frusto-conical extension assembly having its free edge abutting the outer end of the spigot-enclosing bell of the adjacent pipe section and being confined entirely within the outer peripheral confines of said bell, the lip portion of at least one of the collar members being provided with an opening having a closure, a body of caulking in the peripheral space between the telescoped spigot and bell terminating short of the free end of the bell, and a body of rubber cement introduced through said closured opening and filling the space around the spigot and within the bell defined by the opposed ends of the gasket and caulking and the inner surface of the frusto-conical extension assembly formed by the pair of lip portions and permanently adhering to the surfaces defining said space.

References Cited in the file of this patent

UNITED STATES PATENTS

| 365,425 | Barclay | June 28, 1887 |
| 1,242,380 | Skinner | Oct. 9, 1917 |
| 1,834,102 | McCalley | Dec. 1, 1931 |
| 1,978,453 | Flynn | Oct. 30, 1934 |

FOREIGN PATENTS

| 282,265 | Great Britain | Dec. 22, 1927 |
| 166,296 | Switzerland | Mar. 1, 1934 |
| 22,536 | Australia | Jan. 18, 1936 |
| 1,046,191 | France | July 8, 1953 |